J. PAUPA AND G. F. HOCHRIEM.
WEIGHING MECHANISM.
APPLICATION FILED FEB. 16, 1918.
1,333,332.
Patented Mar. 9, 1920.
3 SHEETS—SHEET 1.
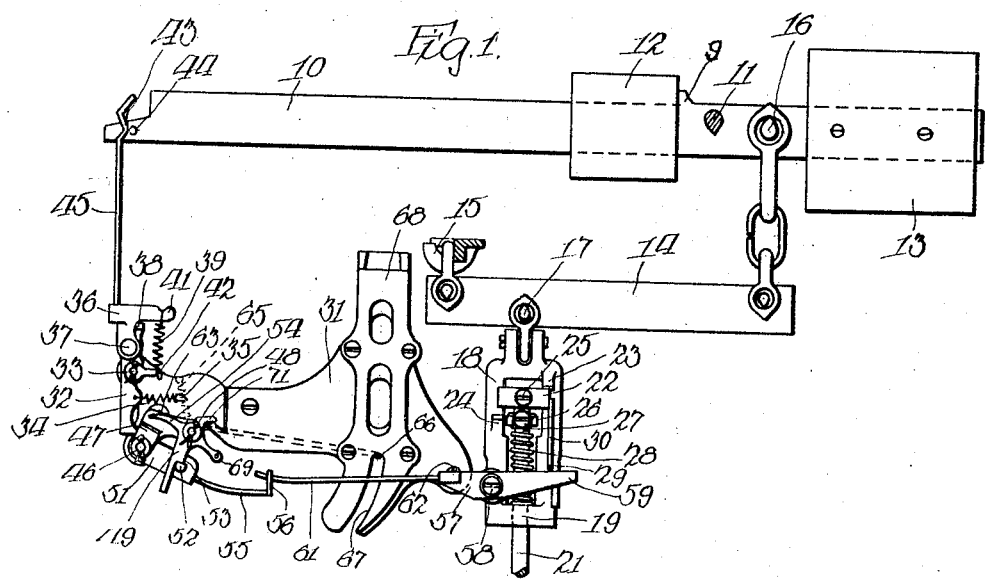
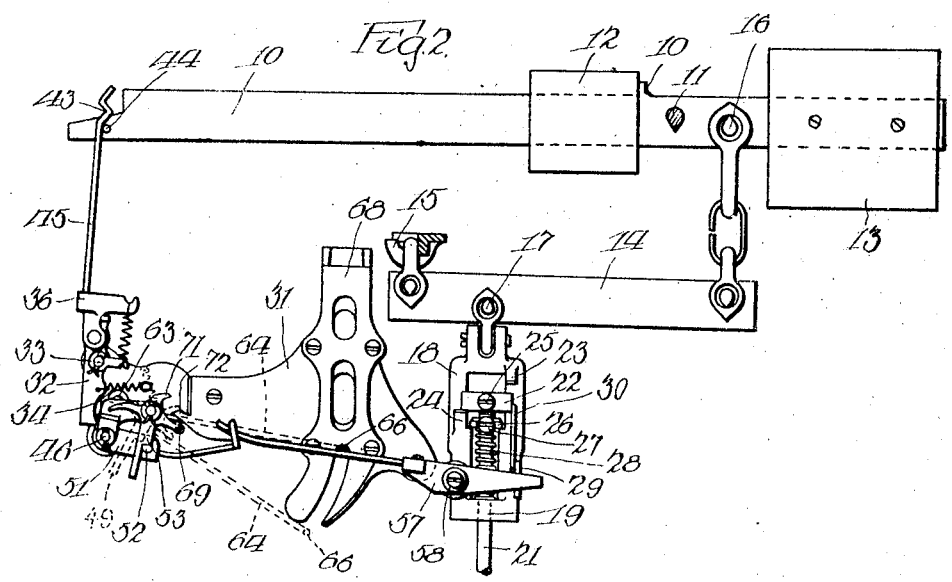
Inventors
Joseph Paupa &
Gustav Hochriem J. PAUPA AND G. F. HOCHRIEM.
WEIGHING MECHANISM.
APPLICATION FILED FEB. 16, 1918.
1,333,332.  
Patented Mar. 9, 1920.  
3 SHEETS—SHEET 2.
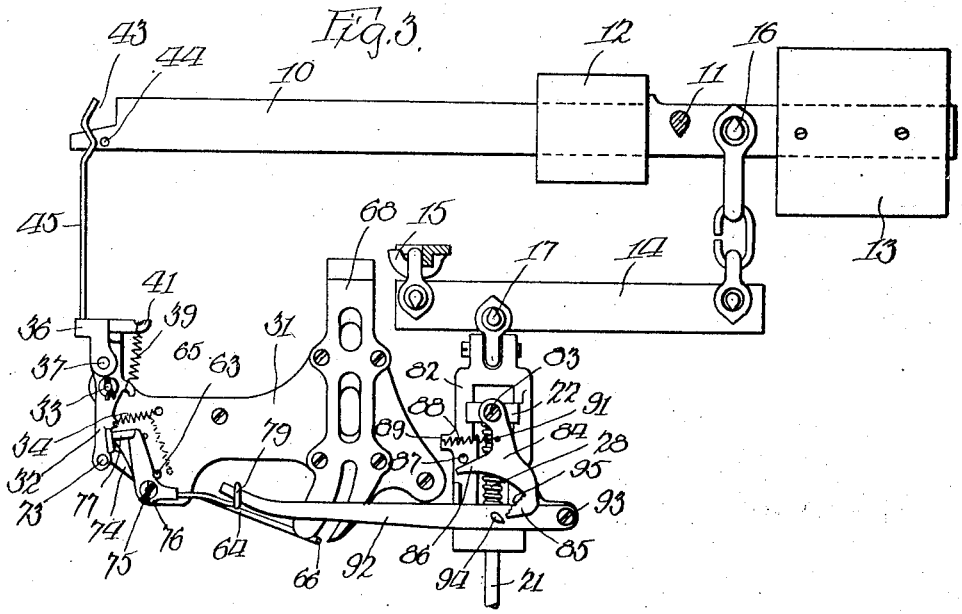
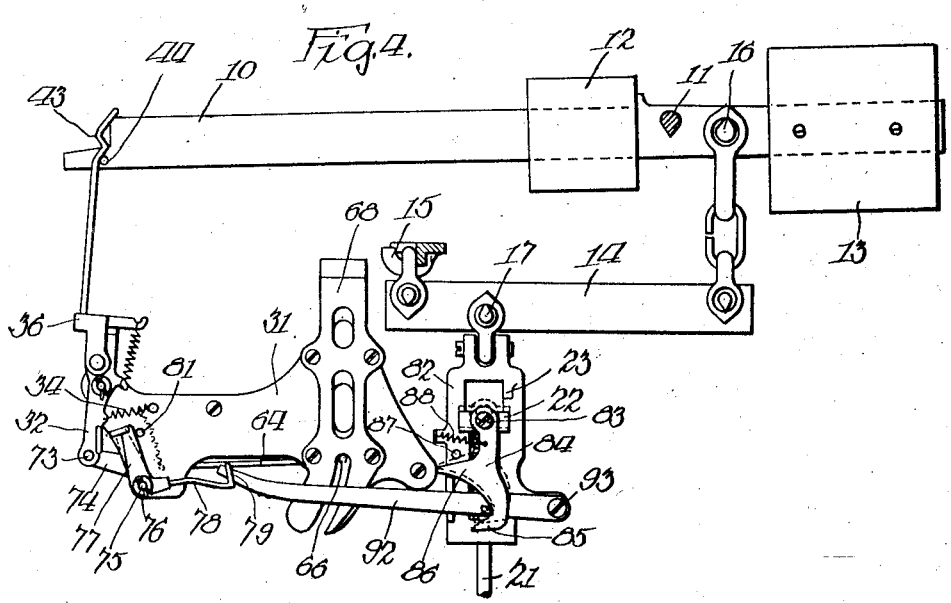
Witness:  
Leo J. Dulmais.
Inventors.  
Joseph Paupa &  
Gustav F. Hochriem  
by Roth Klotz  
Atty.

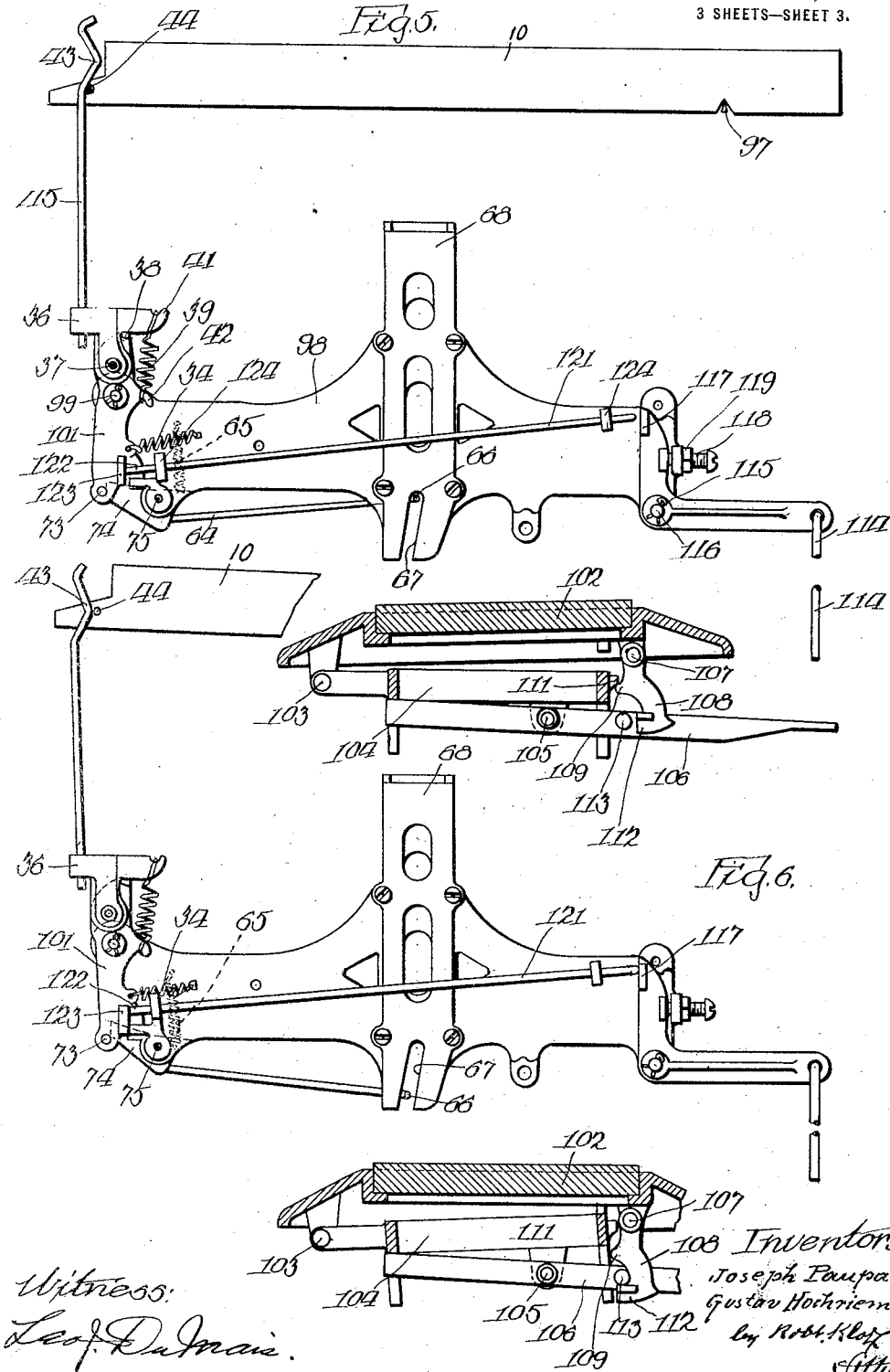

UNITED STATES PATENT OFFICE.

JOSEPH PAUPA AND GUSTAV F. HOCHRIEM, OF CHICAGO, ILLINOIS.

WEIGHING MECHANISM.

1,333,332.                Specification of Letters Patent.    Patented Mar. 9, 1920.

Application filed February 16, 1918. Serial No. 217,496.

*To all whom it may concern:*

Be it known that we, JOSEPH PAUPA and GUSTAV F. HOCHRIEM, citizens of the United States, residing at Chicago, in the county of Cook and State of Illlinois, have invented certain new and useful Improvements in Weighing Mechanism, of which the following is a specification.

This invention relates to weighing mechanisms and is in the nature of an improvement upon the weighing mechanism set forth in United States Patent No. 1,143,224, issued to us June 15, 1915.

The primary object of our invention is the provision, in a weighing machine embodying a scale beam and a movable weight therefor, of a detent for arresting movement of the beam to balanced position, and mechanism whereby the detent is normally held out of the path of movement of the beam so that the beam is free to come to the balanced position; whereby the presence on the weighing machine of an object to be weighed causes the detent to move into its operative position and prevent balancing of the beam; and whereby the dropping of a coin into the machine releases the detent from its operative position. By this mechanism the person desiring to be weighed is enabled to first balance the scale beam and thus assure himself that the weight given will be correct. Having balanced the beam, however, the operator, upon stepping on the platform of the machine, is prevented from weighing himself until the proper coin has been deposited. When the operator has concluded the act of weighing himself and leaves the platform of the machine, the detent is left in its normal inoperative position, in order that the next patron may balance the scale beam before weighing himself.

A second object of our invention is the provision, in a weighing machine embodying a scale beam and a movable weight therefor, of a detent normally urged to its inoperative position but held by a thrust arm in its operative position where it prevents movement of the beam to balanced position, and mechanism, also connected to the platform of the machine, whereby the detent is reset in its operative position after the act of weighing; together with means whereby the deposit of a coin in the machine operates the thrust arm to release the detent to the inoperative position of the latter; said mechanism, when the weight is removed from the platform, acting to move the detent to operative position and permitting the catch to move to a point where it holds the detent in said operative position. A weighing machine constructed in accordance with this second object of our invention permits the operator to balance the scale beam only after the deposit of a coin whereas in a machine constructed in accordance with said primary object the person desiring to be weighed may balance the scale beam before depositing a coin.

A third object of our invention is the provision of a modified form of mechanism, employing a thrust rod, for performing the functions described in said second object.

Other objects and advantages of our invention will become apparent from the following description taken in conjunction with the accompanying drawings which form a part of this specification and illustrate the preferred embodiment of our invention.

In the drawings:

Figure 1 is a front elevation of the scale beam and associated parts together with mechanism for carrying out the primary object of our invention. In this figure the parts are shown in their normal position.

Fig. 2 is a view of the same parts in different relative positions.

Fig. 3 is a front elevation of a modified scale beam and associated parts, together with mechanism for carrying out said second object of our invention; and illustrates that position assumed by the parts after the deposit of a coin in the machine and before the object to be weighed has been placed upon the platform.

Fig. 4 is a view of the modified parts shown in Fig. 3, illustrating in full lines the relative positions assumed when the object to be weighed has been placed upon the platform of the machine and before the deposit of a coin: to illustrate an action hereinafter described, certain of the parts in Fig. 4 are shown by dotted lines in different positions.

Fig. 5 is a view of a scale beam and the platform of a weighing machine, together with differently modified mechanism for carrying out said third object of our invention, and illustrates the parts in the relative positions which they occupy before the weighing operation and before the deposit of a coin in the machine.

Fig. 6 is a similar view of the modified parts shown in Fig. 5, but illustrates them in the positions assumed when the object to be weighed has been placed upon the platform and a coin deposited in the machine.

For the sake of clearness the platform has been omitted in Figs. 1 to 4 inclusive, and for the same reason the standard on which the platform, the scale beam, and the mechanism are supported has been omitted in all of the figures.

Referring to Figs. 1 and 2, reference numeral 10 indicates a scale beam mounted on a pivot 11 in any suitable standard, not shown. A sliding weight 12 is carried on the scale beam and is the weight used by the operator in determining how heavy he is. At 13 is shown the ordinary correcting weight normally screw threaded upon the rear end of the scale beam. In the particular type of scale shown in Figs. 1 to 4 inclusive there is employed an intermediate beam 14. At one end the beam 14 is pivotally supported from a hook 15 suitably mounted in the machine, and at the other end it is linked to trunnions 16 carried on the rear end of beam 10. Trunnions 17 are carried on the intermediate beam 14 at a suitable point between its ends, and a yoke 18 is pivotally suspended from them. Passing loosely through a bearing 19, formed at the lower end of the yoke, is a tension rod 21 which at its lower end is connected, preferably pivotally, with the platform of the weighing machine; in Figs. 1 to 4 this platform is not illustrated, but it may be any suitable weighing machine platform which has a slight downward movement when the object to be weighed is placed upon it and which is upwardly reciprocated when the weight is removed. It is to be understood, therefore, that the presence upon the platform of an object to be weighed causes downward movement of the substantially vertical tension rod 21. A cross-head 22 is vertically guided between the side reaches of the yoke 18 and is limited in its upward movement by a shoulder 23 formed on the yoke, and, in its downward movement, by a similar shoulder 24. The tension rod 21 has its upper end threaded into the center of cross-head 22 and held there by means of a set-screw 25, so that by loosening the set-screw and revolving the rod the latter may be vertically adjusted with respect to the cross-head. Threaded upon the upper end of rod 21 at a point below cross-head 22 is a collar 26, held in any desired adjusted position upon the rod by means of a set-screw 27. A strong coil spring 28 is interposed between the bearing 19 of the yoke and the collar 26, and through this spring the downward pressure of a weight upon the platform is communicated to the yoke and from the yoke through intermediate beam 14 and trunnions 16 to the scale beam 10. For a purpose to be later described the cross-head 22 carries a foot 29 which is rigidly secured on the cross-head and depends therefrom; this foot preferably comprises a vertical piece of stiff wire 30 which at its lower end is bent horizontally forward to form the foot 29.

Suitably positioned in the weighing machine, preferably at a point below scale beam 10, is a frame 31, and at the left hand end of this frame a detent lever 32 is pivoted as at 33. A spring 34 connects the lower end of the substantially vertical detent lever 32 with a hook 35 positioned on frame 31 to the right of the detent lever and serves to draw the lower end of the detent lever to the right and to throw its upper end, consequently, to the left. A detent 36 is pivoted as at 37 upon the detent lever 32 at a point above pivot 33 and is normally held against a shoulder 38, formed at the upper end of the detent lever, by means of a spring 39 which connects a hook 41 formed on the detent with a hook 42 formed on the detent lever. By means of spring 39 the detent 36 and detent lever 32 are normally operated in synchronism: the principal function of spring 39 is to protect detent 36 from mutilation or distortion through the act of one tampering with the weighing machine and forcibly thrusting scale beam 10 up and down across the rubbing point 43 which is formed at the upper end of the detent and which, by being projected into the path of a horizontal bar 44 carried at the free end of the scale beam, acts, when in the full line position of Fig. 2, to prevent the balancing of scale beam 10. It is to be understood that detent 36 throughout this specification includes the nearly vertical wire 45 and the rubbing point 43 formed at the upper end thereof.

Mounted on a horizontal pivot 46, supported in frame 31 at a point slightly below the detent lever 32, is a detent lever operating arm 47 which, when moved in a counter-clockwise direction, throws the lower end of the detent lever to the left (see Fig. 1) and moves the rubbing point 43 of the detent into the path of movement of bar 44 on the scale beam: the latter position of parts is illustrated in full lines in Fig. 2. At its extreme right hand end the lever operating arm 47 carries a forwardly protruding horizontal pivot 48 upon which is revolubly mounted a trigger generally indicated at 49 in Figs. 1 and 2. A catch lever 51 is revolubly mounted on pivot 46 preferably between the frame 31 and the detent lever operating arm 47. This catch lever is revoluble upon pivot 46 independently of arm 47. A horizontal catch 52 projects forwardly from catch lever 51 at a point below trigger 49, this catch engaging a shoulder 53 formed on the trigger below pivot 48 so that during upward movement of the catch lever from the position of Fig. 1 to that of Fig. 2 the shoulder 53 of the trigger rides upon catch 52 and operates to thrust operating arm 47 in a counter-clockwise direction, thereby moving the rubbing point 43 of the detent into the full line position of Fig. 2 where it arrests movement of the scale beam to balanced position. By means of a weight 54, formed on the trigger 49 at the left side thereof, the trigger is given a normal tendency to turn in a counter-clockwise direction so that shoulder 53 will always return to engagement with catch 52 after the tripping of the trigger. The catch lever 51 comprises a fixed wire extension 55 formed into a substantially vertical loop 56 at its right extremity. A catch operating bar 57 is pivoted as at 58 near at the lower end of yoke 18 and has its rear end 59 lying across the path of movement of foot 29. The forward or left hand end of the catch operating bar is attenuated by means of a wire 61 which extends through loop 56; this wire being either brazed to the main portion of lever 57 or adjustably secured thereto by means of a machine screw 62. The wire 61 stands forwardly of the frame 31.

Pivoted as at 63 against the rear face of frame 31 is a coin operated lever 64 normally held, by means of a spring 65, in the position illustrated in Fig. 1 wherein its forwardly and horizontally bent free end 66 stands at the upper extremity of a transverse slot 67 formed in the lower end of a coin chute generally indicated at 68 in the drawings. The trigger 49 carries on its right hand side a horizontally disposed rearwardly projecting post 69 which stands below and in the path of movement of coin operated lever 64.

In the operation of our invention as embodied in Figs. 1 and 2, and assuming the parts to be in the position shown in Fig. 1, the person desiring to be weighed may touch scale beam 10 with his finger and, as the sliding weight 12 is back against the rear stop 9, he will see, from the fact that the beam returns to the horizontal position, that the scales are in balance. He now steps upon the platform (not shown) and his weight is communicated through tension rod 21, collar 26, spring 28, yoke 18, and intermediate beam 14 to the scale beam 10. But the movement of the scale beam to balanced position, after the operator has stepped upon the platform, is prevented by the fact that rubbing point 43 of the detent 36 is instantly projected into the path of movement of bar 44. This movement is accomplished in the following manner: The depression of tension rod 21 lowers cross-head 22 and causes foot 29 of wire 31 to move the right hand end 59 of catch bar 57 downwardly; this causes elevation of the left hand wire end 61 of the catch bar and consequent elevation of loop 56, wire extension 55, and catch lever 51, causing the catch lever to move in a counter-clockwise direction about pivot 46 from the full line position of Fig. 1 to that of Fig. 2; this movement of the catch lever is communicated through catch 52, shoulder 53, trigger 49 and pivot 48 to the catch lever operating arm 47 which, by its resultant counter-clockwise movement, swings detent lever 32 in a clockwise direction about its pivot 33 and thereby moves the rubbing point 43 against bar 44 of the scale beam. The parts now occupy the position illustrated in full lines in Fig. 2 and the operator may release the scale beam for the purpose of weighing himself by dropping a coin into the chute 68. The coin will strike the horizontal end 66 of coin operated lever 64 causing that lever to swing downwardly into the dotted line position of Fig. 2. That downward swing of lever 64 brings that lever into contact with post 69 and causes sufficient clockwise movement of the trigger about pivot 48 to throw shoulder 53 off of catch 52. This position of the shoulder 53 is indicated in dotted lines in Fig. 2, though the other portions of the trigger are not shown in dotted lines in this position for the sake of clearness in the drawings. The thrusting connection between catch lever 51 and detent lever operating arm 47 having been idled by this passage of shoulder 53 off of catch 52, the lever 47 is free to move in a clockwise direction about pivot 46 under the influence of spring 34 and from the full line position of Fig. 2 to that of Fig. 1; the result of this latter movement being that the detent lever and detent move in a counter-clockwise direction about pivot 33 sufficiently to cause rubbing point 43 to stand clear of bar 44, as illustrated in full lines in Fig. 1. The clockwise movement of arm 47 under the influence of spring 34 is limited by contact between a stop 71 formed on trigger 49 and a stud 72 formed on frame 31, contact between these latter elements causing contact also between the substantially vertical right hand face of shoulder 53 and the left hand side of catch 52. The operator may now adjust weight 12 to counter balance his own weight, the scale beam 10 being free to come to balanced position. Regardless of the point on the scale beam at which the operator leaves the sliding weight 12, the parts illustrated in Figs. 1 and 2 will return automatically to the position illustrated in Fig. 1 when the operator's weight is removed from the platform of the machine, for the elevation of tension rod 21 will raise foot 29 permitting wire 61 and catch 51 to drop so that catch 52 stands below shoulder 53. The weight 54 on the trigger will insure engagement between shoulder 53 and catch 52. It is to be noted that loop 56 is considerably larger than the diameter of wire 61 and that catch lever 51 is very loosely mounted on pivot 46 so that when the parts are in the normal position shown in Fig. 1, or in the position which they assume when the operator is on the platform and the coin has been dropped, there is a negligible element of friction affecting yoke 18 because of these parts, it being further noted that catch bar 57 is loosely mounted on pivot 58.

Referring to Figs. 3 and 4 which illustrate structure designed to carry out the above mentioned second object of our invention, the lower end of the detent lever 32 carries a rearwardly extending horizontal post 73, and coin operated lever 64 is provided on the opposite side of its pivot 63 with a thrust arm 74 which has its left end (see Fig. 4) normally abutted against post 73 to hold detent 36 and point 43 in the operative position wherein point 43 prevents movement of the scale beam 10 to balanced position. The dropping of a coin through chute 68 moves the coin operated lever 64 in a clockwise direction throwing arm 74 above and clear of the post 73 and permitting spring 34 to move the detent lever 32 and detent in a counter-clockwise direction to the inoperative position of the detent shown in Fig. 3.

Upon a horizontal pivot 75 extending forwardly from frame 31 is pivoted a bell-crank indicated at 76 and comprising an arm 77 adapted to contact with the lower end of detent lever 32, and a substantially horizontal wire arm 78 formed with a loop 79 substantially identical with loop 56. The clockwise movement of bell-crank 76 is limited by a stud 81 mounted in frame 31, and the opposite movement is limited by the lower end of detent lever 32 and the tension of spring 34 on the latter. In the modification of our invention illustrated in Figs. 3 and 4 we employ, in place of yoke 18, a slightly different yoke 82. The cross-head 22 in Figs. 3 and 4 is provided with a horizontal pivot 83 projecting forwardly, this pivot carrying a dog 84 formed at its lower end with a serrated jaw 85 and, intermediate its ends, with a cam finger 86 positioned, during the rising movement of the dog, to move against and be affected by a stud 87 projecting forwardly from the left hand reach of yoke 82. A tension spring 88, secured at one end to a bracket 89 on the left hand reach of the yoke, and fastened at its other end through an eye 91 in the dog 84, insures contact between cam finger 86 and post 87 during the upward movement of the dog. A lever 92 for operating the bell-crank 77—78 is pivoted as at 93 to the yoke 82 at a point somewhat to the right of dog 84 and carries a tooth 94 provided with an edge projected toward the serrations 95 of jaw 85. The left hand free end of lever 92 is inserted in loop 79.

In the operation of the mechanism illustrated in Figs. 3 and 4, it will be noted that in Fig. 3 the person desiring to be weighed has dropped a coin through chute 68 thereby moving lever 64 and thrust arm 74 from the full line position of Fig. 4 to that of Fig. 3 and moving the detent out of the path of bar 44, and hence releasing the scale beam so that he may balance the beam to assure himself that the scales are in proper condition for accurately recording his weight. Considering the parts as in the position occupied in Fig. 3, the weight of the operator stepping upon the platform of the machine draws cross-head 22 and dog 84 downward from the position of Fig. 3 to the position shown in full lines in Fig. 4, thereby causing a number of serrations 95 to pass below and across tooth 94 until the tooth engages with one of the upper serrations. The operator may now weigh himself by proper manipulation of weight 12, but when he steps from the platform of the machine the action of spring 28 elevates dog 84, tooth 94 and lever 92, causing counter-clockwise movement of bell-crank 76. This latter movement is sufficient to bring the leg 77 of the bell-crank against the lower end of detent lever 32 and to swing post 73 so far to the left that thrust arm 74, under the influence of spring 65, may move into the position illustrated in Fig. 4 thereby resetting the detent in its operative position and preventing the use of the weighing machine until another coin has been deposited in chute 64. The last described counter-clockwise movement of bell-crank 76 is momentary, for as dog 84 rises from the full line to the dotted line position of Fig. 4, the cam finger 86 strikes post 87 and the continued elevation of the dog, by reason of the cam, results in throwing the jaw 85 clear of tooth 94 so that lever 92 drops, immediately after the operator leaves the platform, and causes clockwise movement of bell-crank 76. This clockwise movement is sufficient to cause leg 77 of the bell-crank to stand spaced from and to the left of the lower end of detent lever 32 so that, when another coin is dropped through chute 68 and thrust arm 74 is elevated into the position of Fig. 3, the detent lever is free to move in a counter-clockwise direction sufficiently to throw rubbing point 43 clear of bar 44. During the act of weighing, the scales are unaffected by lever 92 inasmuch as that lever exerts no weight on jaw 85 until the operator steps from the platform of the machine.

The spring 28 is made so strong that articles weighing preferably not to exceed fifty pounds may be weighed without causing any compression of that spring and consequent operation of the detent against the scale beam. Hence, without dropping a coin into the chute, persons having parcel-post packages to despatch can weigh the same free of charge, though the presence upon the platform of any person weighing over fifty pounds will actuate the detent and necessitate the deposit of a coin to clear the scale beam. By adjustment of collar 26 up or down upon the tension-rod the force exerted by spring 28 between the tension-rod and the yoke may be varied so that the number of pounds which may be weighed free can be adjusted in the discretion of the proprietor of the machine.

In Figs. 5 and 6 is illustrated structure designed to carry out the above mentioned third object of our invention, that is: structure which omits certain of the parts included in Figs. 3 and 4 and provides a much simpler construction while at the same time accomplishing substantially those functions inherent in the structure shown in Figs. 3 and 4. In these figures reference numeral 10 indicates a scale beam horizontally pivoted as at 97 to the standard of the machine (not shown). The bar 44 is carried at the outer end of beam 10. A frame 98, similar to frame 31 in Figs. 1 to 4, carries a pivot 99 upon which is mounted a detent lever 101 the lower end of which is normally drawn to the right by spring 34. Detent 36 is pivoted as at 37 upon the upper end of detent lever 101. The tendency of the detent 36 and its rubbing point 43 is to stand in the position illustrated in Fig. 6 wherein the point 43 is just out of the path of movement of bar 44, permitting the beam 10 to swing freely to balanced position. Normally however the parts illustrated in Figs. 5 and 6 stand in the position shown in Fig. 5 wherein thrust arm 74, acting through post 73 and detent lever 101 holds the wire 45 against bar 44 and prevents movement of the scale beam to balanced position.

In the lower portion of each of Figs. 5 and 6 is shown in section a portion of the platform mechanism of our improved weighing machine, this mechanism being in all respects the same as that disclosed in the patent above referred to. In this platform mechanism the platform 102 is hinged as at 103 to a platform frame 104 to which latter is also hinged, intermediate its ends, at 105, a lift rod 106. Swung from a pivot 107 on platform 102 is a catch 108. By means of a coil spring (not shown) the platform 102 is maintained in slightly elevated position at one end as illustrated in Fig. 5. When in this position the catch 108 is held at its extreme right hand position, as shown in Fig. 5, by contact between a projection 109 formed on the catch and a cam 111 fixed upon the platform frame 104. When the catch 108 is in this right hand position, a finger 112 formed upon its lower end is out of contact with an arm 113 projecting laterally from the lift-rod 106.

Referring to Fig. 6 it will be seen that when an object to be weighed is placed on platform 102 the depression of the free end of the platform into the substantially horizontal position of Fig. 6 removes projection 109 from cam 111, permitting the finger 112 to assume by gravity a position directly under the arm 113 without, however, causing any movement of the lift-rod 106. Upon removal of the object to be weighed, however, from the platform 102 the spring induced elevation of the free end of the platform raises finger 112 also, and this finger catches the arm 113 and elevates the right hand end of lift-rod 106. This elevation of the lift-rod is of short duration, as the ensuing contact between projection 109 and cam 111 causes the finger 112 to move away from its contact with the arm 113 when the platform assumes its normal uptilted position, as in Fig. 1. It will be seen, therefore, that the lift-rod 106 is only actuated when the object being weighed is removed from platform 102, such actuation being a simple elevation and subsequent drop of the outer, right hand end of the rod as viewed in the drawings. Just above the right hand end of lift-rod 106 is a substantially vertical thrust rod 114 which normally hangs suspended out of contact with the lift-rod but which is vertically reciprocated in synchronism with the elevation and depression of the lift-rod. At its upper end the thrust-rod is swung from one end of a bell-crank 115 pivoted as at 116 to the frame 98 and having its other leg upstanding as at 117. By means of an adjustable set screw 118 and a lock-nut 119 mounted in the frame 98 the gravity induced fall of lift-rod 114 is limited. The upper end 117 of bell-crank 115 stands opposite the right hand end of a thrust bar 121, the left hand end 122 of the thrust bar standing opposite an abutment 123 formed on the lower end of detent lever 101. The thrust bar 121 is slidably carried in a pair of lugs 124 and is preferably slightly canted from the right downwardly to the left in those lugs. This thrust bar is preferably slightly less in length than the distance between leg 117 of the bell-crank and abutment 123 of the detent lever.

In the operation of the mechanism illustrated in Figs. 5 and 6 and assuming the parts to be in the position of Fig. 5, the person desiring to be weighed drops a coin through chute 68 thereby moving lever 64 and thrust arm 74 from the position of Fig. 5, to that of Fig. 6 permitting the detent to swing free of bar 44 and releasing the scale beam 10 for movement to balanced position. Having assured himself that the scales are in good order, the operator steps upon platform 102 causing the above described depression of the platform and the positioning of finger 112 beneath arm 113. By manipulation of the sliding weight 12 (not shown in Figs. 5 and 6) the operator completes the act of weighing himself. Upon leaving the platform 102 the elevation of the platform together with finger 112, arm 113, lift-rod 106, and thrust-rod 114 operates to move end 117 of bell-crank 115 quickly and forcibly against the right hand end of thrust-bar 121. This causes the end 122 of the thrust bar to throw post 73 so far to the left that spring 65 can move thrust arm 74 into the position of Fig. 5 wherein the thrust-arm is interposed between pivot 75 and post 73. In this latter position the scale beam is again held from movement to balanced position.

The herein described weighing machine is, by the dropping of the coin, automatically conditioned for weighing a person standing on the platform thereof, whereas, in older types of weighing machines it was necessary to operate a hand lever after the dropping of the coin, in order to condition the machine for weighing.

While we have illustrated and described the preferred embodiment of our invention, it is obvious that one skilled in the art may construct modifications thereof without departing from the spirit of the invention. We wish, therefore, not to be restricted to the precise embodiment shown except in so far as the same is limited in the appended claims.

We claim:

1. In a weighing machine, the combination with weighing devices, of a frame, a detent lever pivotally mounted on the frame, a detent carried on said detent lever and adapted, when in operative position, to arrest the weighing action of said devices, a spring normally holding said detent lever and detent in inoperative position, a pivot protruding from the frame, a detent lever operating arm mounted on said pivot and against which said detent lever normally abuts at a point remote from said pivot, a catch lever also mounted on said pivot and provided with a catch, a trigger pivotally carried on said detent lever operating arm and provided with a shoulder for engagement with the catch, a weighing platform, apparatus connecting said catch lever with the platform for operation thereby, and a coin operated lever positioned to trip said trigger.

2. In a weighing machine, the combination with weighing devices, of a frame, a detent lever pivotally mounted on the frame, a detent carried on said detent lever and adapted, when in operative position, to arrest the weighing action of said devices, a spring normally holding said detent lever and detent in inoperative position, a pivot protruding from the frame, a detent lever operating arm mounted on said pivot and against which said detent lever normally abuts at a point remote from said pivot, a catch lever also mounted on said pivot and provided with a catch, a trigger pivotally carried on said detent lever operating arm and provided with a shoulder for engagement with the catch whereby said trigger is interposed between the catch and detent lever operating arm to cause said catch to operate said arm, a weighing platform, a tension rod pivotally connected to the platform, a yoke supported from said devices and slidably embracing the tension rod, a catch operating bar pivotally mounted on the yoke and having one end inserted in a loop formed in said catch lever, a spring interposed between the yoke and the tension rod, a foot carried by the tension rod and positioned to move said catch operating bar by contact with the opposite end thereof, and a coin operated element positioned to trip said trigger.

3. In a weighing machine, the combination with weighing devices, a weighing platform, means for controlling the operation of said devices, and a pivoted bar for actuating said means, of apparatus for actuating said bar, comprising a yoke supported from said devices and having parallel side reaches forming guides, a cross-head vertically guided in said side reaches, a tension rod pivotally connected with said platform and having an end threaded into said cross-head, there being a tension rod bearing formed in the lower end of said yoke through and above which the tension rod extends, a collar threaded upon the tension rod above the bearing and below the cross-head, a spring interposed between said collar and bearing, and a foot depending from the cross-head and extending across an end of said pivoted bar.

In testimony whereof we have affixed our signatures.

JOSEPH PAUPA.
GUSTAV F. HOCHRIEM.